July 19, 1938.  B. ENGELS  2,123,937
METHOD OF MOLDING HOLLOW BODIES OF GLASS
Filed May 24, 1935
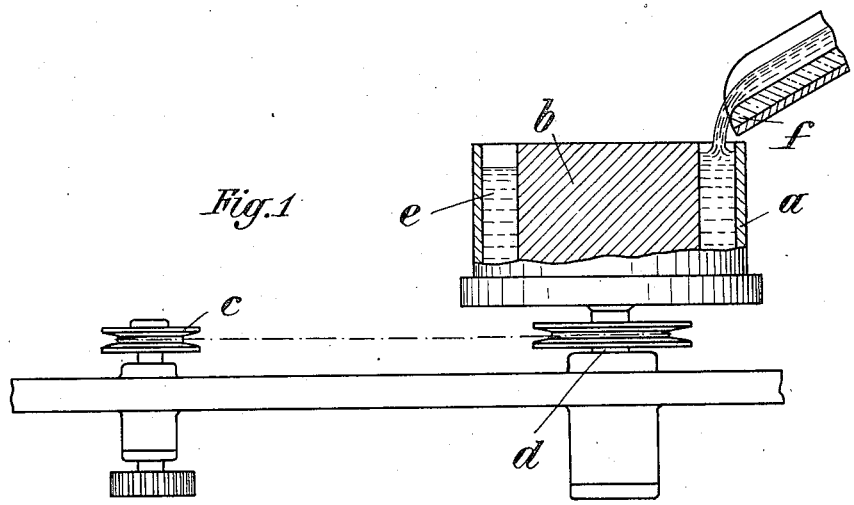
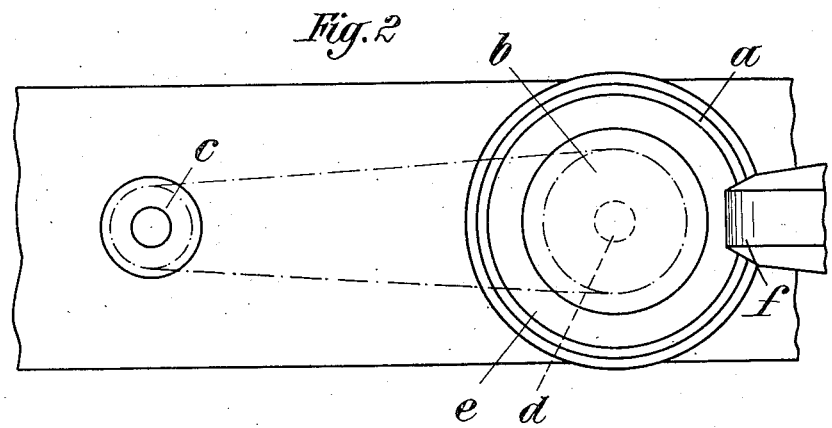
Inventor:
Bernhard Engels
By Owen & Owen
attorneys Patented July 19, 1938

2,123,937

UNITED STATES PATENT OFFICE 2,123,937

METHOD OF MOLDING HOLLOW BODIES OF GLASS

Bernhard Engels, Waldenburg-Altwasser, Germany

Application May 24, 1935, Serial No. 23,289
In Germany August 7, 1934

2 Claims. (Cl. 49—85)

This invention relates to a method of molding hollow bodies of glass or other fusions of silicates, such as molten quartz, particularly with respect to the production of hollow bodies of this class having large diameters and requiring a considerable wall thickness.

Such hollow bodies, e. g., tubes, cylinders, etc., were hitherto exclusively fashioned in accordance with methods which had the feature in common that the hollow body was shaped at all points of its circumference at the same time, so that the entire extent of the body was produced simultaneously, either by catching the molded articles by means of a blowing-iron and drawing them off while blowing or in a more or less mechanical manner and likewise by drawing off the still plastic glass from a round pipe member, for instance according to the Danner or Phillips methods.

Another known process consisting in blowing the glass mass into a mold also provides for the simultaneous production of the entire circumference of the article to be made.

It is evident that the application of these known molding methods in practical operation sets very narrow limits to the dimensions both as to diameter and wall thickness, which are attainable, the more so as with the increase in diameter the wall thicknesses that could still be obtained were reduced, although, as a rule, just the opposite is desirable, namely, to impart greater wall thickness to articles having a larger diameter.

The practical impossibility of producing hollow bodies of the kind mentioned having dimensions as to diameter and wall thickness, which exceed a certain limit, has therefore prevented the more extensive use of such hollow bodies, for instance in the form of glass tubes for industrial purposes, in spite of the demand existing therefor.

Departing in principle from the molding methods hitherto in use, the present invention affords the possibility of producing such hollow bodies with diameters and wall thicknesses of practically any desired size by providing a shaping method according to which the body is not built up simultaneously at all points of its circumference but successively, i. e., by applying layers of fresh glass to those in the mold or to those being already in a shaped condition.

It has been found that if the glass mass running out of a container into the mold is applied in such layers, a perfectly homogeneous union thereof with the mass positioned already in the mold is effected, provided the latter mass is prevented from cooling in the meantime as by regulating the temperature of the mold by means of additional heating or also cooling means.

The practical application of the new method is effected by moving the mold relative to the glass stream coming out of a casting vessel, i. e., by employing either a mold moving past the glass stream or a stationary mold in connection with a correspondingly moved outlet opening of the casting vessel.

Embodying the principle outlined above, the new method can find expression in various forms of construction.

For example, it is possible to cause rotation of the mold provided with a central core and to build up in the mold the hollow body from below in an upward direction by means of the incoming glass stream which, during rotation of the mold, always forms a new layer on the one already located in the mold and unites therewith. Or the velocity of rotation may be reduced preparatory to building up the body in circumferential direction, though this involves limitations as to the linear dimensions of the body.

The method is further not limited to the production of regular rotational bodies, since other shapes, preferably of course such as have a closed circumference, can be produced in the manner described, in which case it may be necessary to direct the rotary motion of the mold in a corresponding curve.

Hollow bodies made according to the new method can be submitted to further working processes by being for instance cut up in cooled condition to produce channels, etc.

The device for carrying out the method according to the invention is differently constructed to be adapted to the different possibilities mentioned above. By way of example, one form of device for carrying out the method with respect to its, at present, most important application, namely the construction of a hollow body from the bottom up, is diagrammatically illustrated in the accompanying drawing, in which Figure 1 is a side view of the device partly in section, and Fig. 2, a plan thereof.

Referring to the drawing, $a$ is the rotary mold provided with the central core $b$ and rotated by a suitable drive $c$ through the medium of belt transmission or the like about a vertical shaft $d$ in such a way that the hollow space $e$ of the mold $a$ is guided under and past the outlet $f$ of the vessel containing the glass mass. The supplementary heating means for the mold $a$, which may be needed, are not shown.

If the method is to be carried out by keeping the mold $a$ stationary and rotating instead the outlet for the glass mass, the construction of the device will be reversed accordingly.

The after-treatment of the molded articles is effected in accordance with the usual methods in glass-making by cooling and hardening if necessary.

The method according to the invention affords the glass industry extensive new opportunities in various fields. For example, it will now be possible to manufacture numerous objects which, owing to the difficulties connected with shaping as described, could not be made from glass hitherto, such as pipings for the chemical industries, for draining and other agricultural purposes, etc., particularly for purposes where the corrosion resisting quality of glass affords special advantages, especially if fragility is reduced to a minimum by subsequent hardening. New possibilities are further provided for the molding of numerous objects which hitherto had to be produced according to other methods and which can now be made from the bodies built up according to the invention, which serve as blanks.

I claim:—

1. A method of molding hollow bodies of glass or other silicic fusions of relative large diameter and corresponding proportionate wall thickness, which consists in providing a mold having a mantle and a core spaced therefrom and rigid therewith, pouring molten glass into such space from above the latter and in effecting rotational movement between the point of pouring and the mold of such degree of rotation as to cause the glass to be successively laid in layers each engaging the mantle and core and to simultaneously weld each layer to the next succeeding layer.

2. A method of molding hollow bodies of glass or like material which consists in pouring molten glass into a defined space of ring-like form and in effecting relative rotation between the pouring point and the defined space at such speed as to cause the glass to be laid into successive layers, the temperature of a laid layer being such that same is simultaneously welded to the succeeding layer.

BERNHARD ENGELS.